(12) United States Patent
Shen (10) Patent No.: US 8,199,465 B2
(45) Date of Patent: Jun. 12, 2012

(54) HINGE AND COLLAPSIBLE DEVICE UTILIZING THE SAME

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 178 days.

(21) Appl. No.: 12/750,680

(22) Filed: Mar. 30, 2010

(65) Prior Publication Data
US 2011/0182004 A1 Jul. 28, 2011

(30) Foreign Application Priority Data

Jan. 27, 2010 (CN) .................. 2010 2 0123077 U (51) Int. Cl.
H05K 5/00 (2006.01)
H05K 7/00 (2006.01)
H04M 1/00 (2006.01)
G06F 3/02 (2006.01)

(52) U.S. Cl. ......... 361/679.01; 361/679.02; 361/679.09; 361/679.11; 361/679.12; 361/679.15; 361/679.26; 361/679.27; 361/679.28; 361/679.3; 361/679.57; 455/575.1; 455/575.3; 455/575.4; 345/168; 345/169

(58) Field of Classification Search ............. 361/679.01, 361/679.02, 679.55–679.59, 679.27, 679.09–679.3; 345/156, 157, 168, 169, 184; 455/575.3, 455/550.1, 56

See application file for complete search history.

(56) References Cited

U.S. PATENT DOCUMENTS

| 2005/0066474 A1* | 3/2005 | Hsu et al. ........................ 16/330 |
| 2009/0165250 A1* | 7/2009 | Duan et al. ..................... 16/343 |
| 2011/0088218 A1* | 4/2011 | Yong et al. ..................... 16/297 |

* cited by examiner

Primary Examiner — Jayprakash N Gandhi
Assistant Examiner — Jerry Wu
(74) Attorney, Agent, or Firm — Altis Law Group, Inc.

(57) ABSTRACT

A collapsible device includes a cover, a base, and a hinge. The cover includes a display on a top of the cover. The base defines a groove extending through a front and a rear sides of the base. The groove defines a keyboard region adjacent to the front side, and a fixing slot adjacent to the rear side. The hinge is connected to a bottom of the cover and the fixing slot. The cover is rotatably received in the groove, and the cover is operable of rotating relative to the display around the hinge, to cover or expose the keyboard region.

10 Claims, 11 Drawing Sheets

HINGE AND COLLAPSIBLE DEVICE UTILIZING THE SAME

BACKGROUND

1. Technical Field

The disclosure relates to a hinge and a collapsible device utilizing the hinge.

2. Description of Related Art

A collapsible device, such as a notebook computer or a clamshell mobile phone, generally includes a main body and a display hinged to the main body. The hinge allows the display to be rotatable with respect to the main body, and to be folded with the main body for saving space.

In use, the display is rotated to a desired angle relative to the main body, facing the users, so that the collapsible device can be conveniently operated. However, it needs a greater space for rotation of the display relative to the main body, which is inconvenient in use, or even limits usage of the collapsible device.

DETAILED DESCRIPTION

Figure 1:
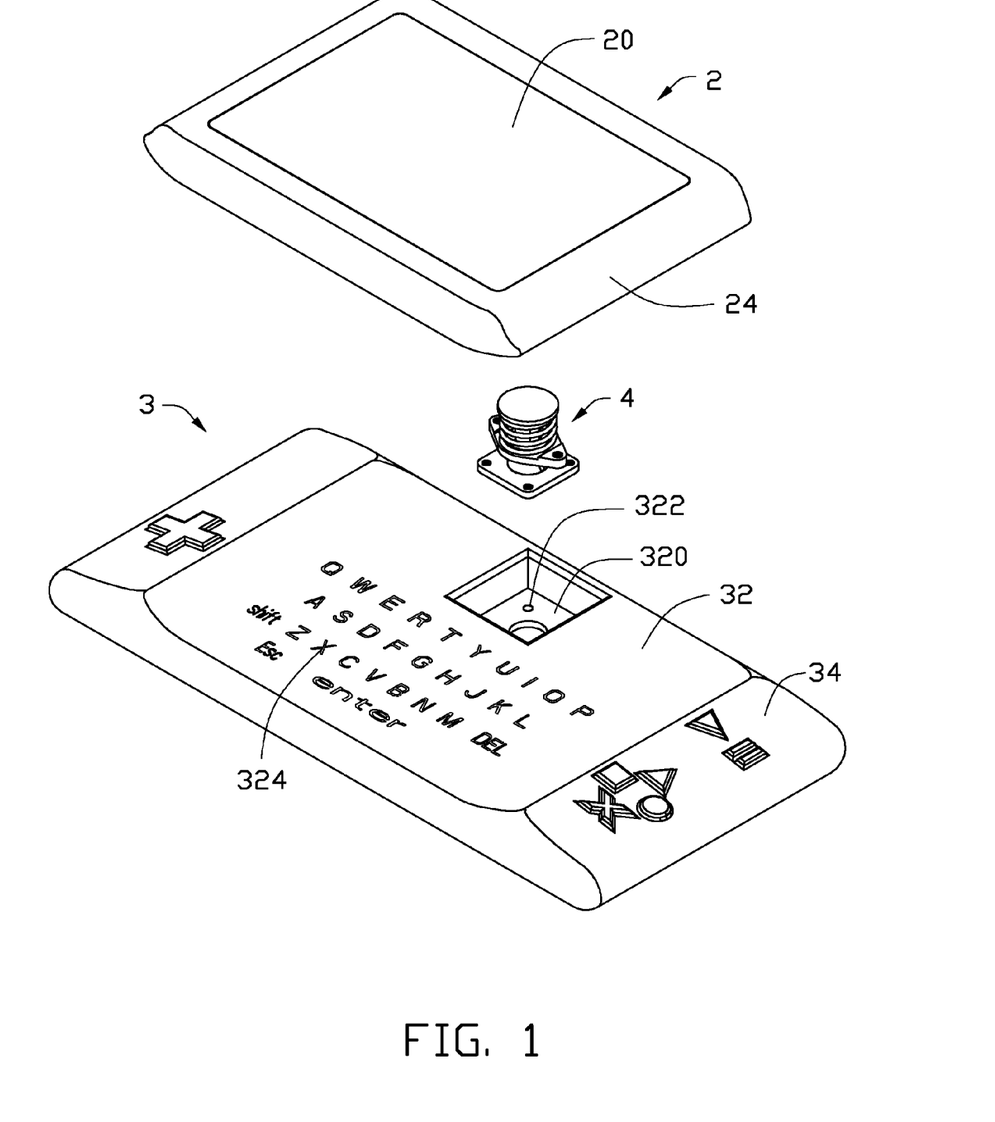
FIG. 1 is an exploded, isometric view of an exemplary embodiment of a collapsible device, the collapsible device includes a base, a hinge, and a cover rotatably mounted to the base via the hinge.
Figure 2:
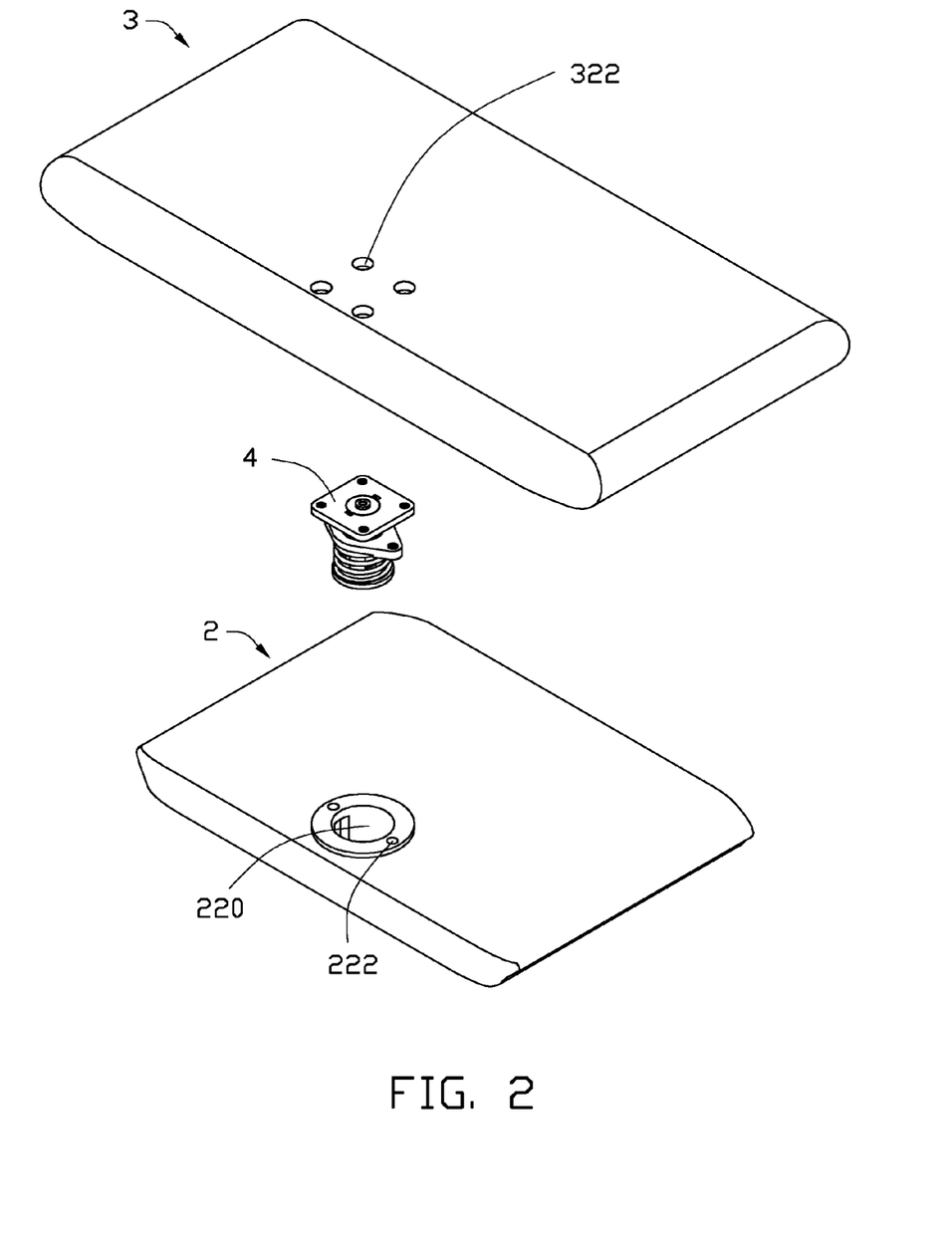
FIG. 2 is an inverted view of the collapsible device of FIG. 1.

Referring to FIGS. 1 and 2, an exemplary embodiment of a collapsible device includes a cover 2, a base 3, and a hinge 4 connecting the cover 2 to the base 3.

The cover 2 includes a display 20 on a top of the cover 2. A bottom of the cover 2 defines a receiving slot 220 adjacent to a rear side of the cover 2, and two fixing holes 222 beside the receiving slot 220. Two opposite ends of the cover 2 curve down from the top of the cover 2 to the bottom of the cover 2 to form two arc-shaped portions 24, correspondingly.

The base 3 defines a groove 32 in a center of the base 3, extending through front and rear sides of the base 3. The groove 32 defines a fixing slot 320 neighboring the rear side of the base 3, corresponding to the receiving slot 220 of the cover 2, and a keyboard region 324 neighboring the front side of the base 3. A bottom of the fixing slot 320 defines a plurality of fixing holes 322. The base 3 further includes two operating portions 34 respectively adjacent to opposite ends of the groove 32, and each operating portion 34 extends in a curve to connect to the corresponding end of the groove 32.

Figure 3:
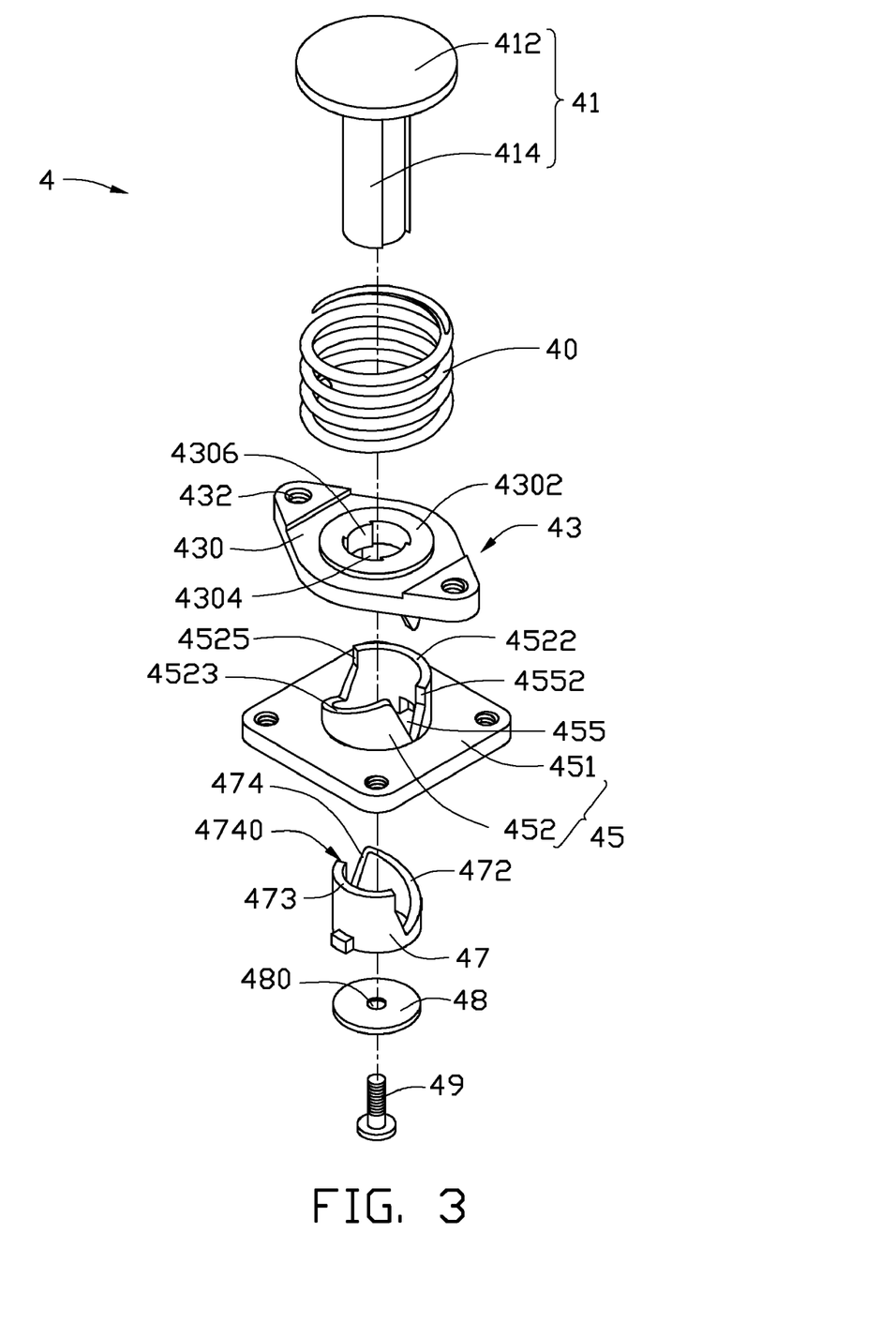
FIG. 3 is an exploded, isometric view of the hinge of FIG. 1.
Figure 4:
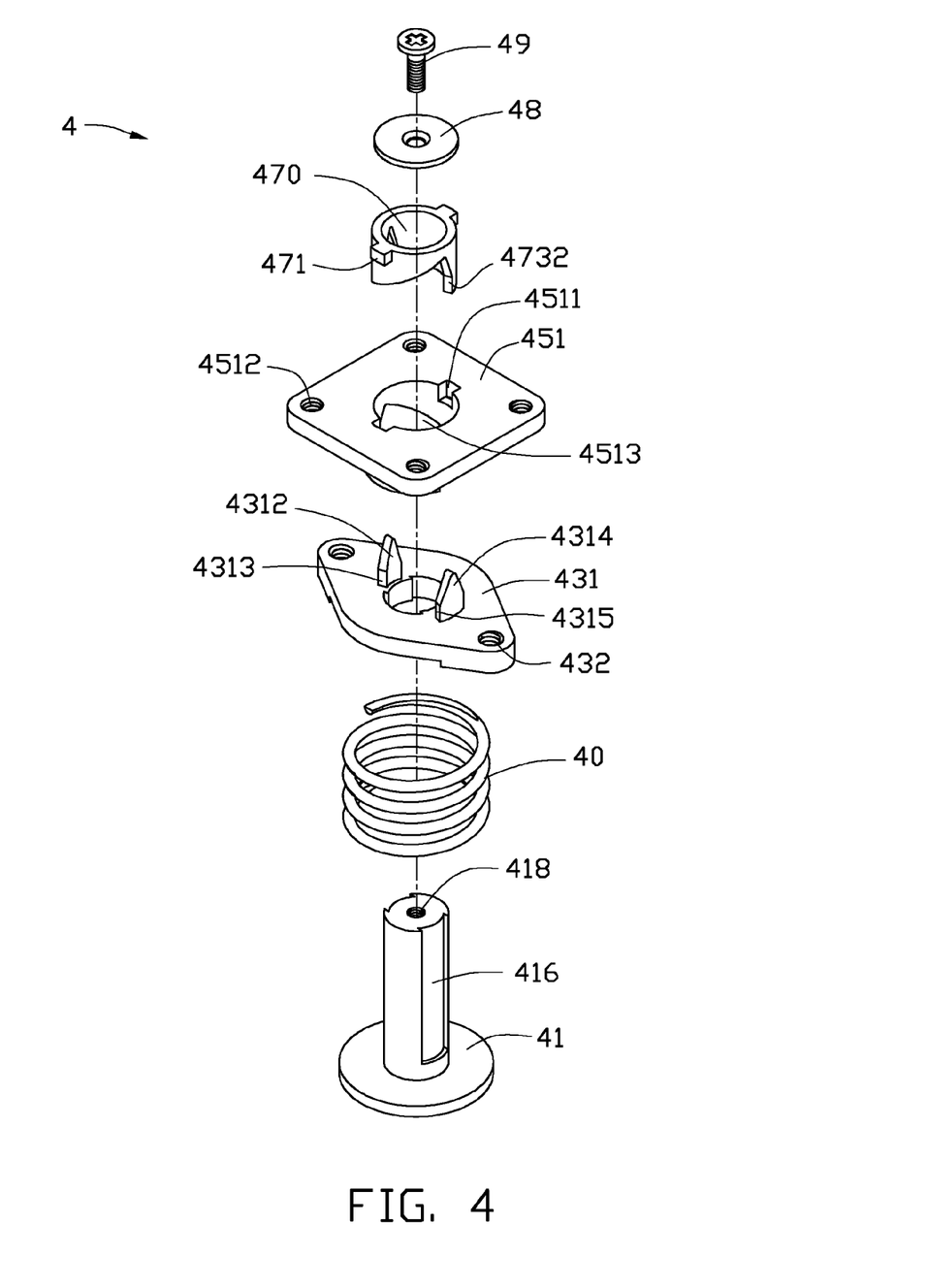
FIG. 4 is an inverted view of the hinge of FIG. 3.

Referring to FIGS. 3 and 4, the hinge 4 includes a resilient member 40, a connecting member 41, a rotating member 43, a fixing member 45, an interfering member 47, a washer 48 defining a through hole 480 in a center of the washer 48, and a fastener 49. In this embodiment, the resilient member 40 is a coil spring.

The connecting member 41 includes a head portion 412, and a shaft portion 414 having a smaller diameter than the head portion 412 and perpendicularly extending from the head portion 412. The shaft portion 414 defines two opposite fixing slots 416, in the circumferential surface of the shaft portion 414. A screw hole 418 is defined in an end surface of the shaft portion 414, opposite to the head portion 412.

The rotating member 43 includes a first side 430, and a second side 431 opposite to the first side 430. The rotating member 43 defines two fixing holes 432 extending through the first and second sides 430, 431, adjacent to opposite ends of the rotating member 43. A cylindrical fixing protrusion 4302 protrudes from a center of the first side 430. The diameter of the fixing protrusion 4302 is equal to the inner diameter of the resilient member 40, such that the fixing protrusion 4302 can be received in the resilient member 40. A through hole 4304 is defined in a center of the fixing protrusion 4302, with opposite fixing ribs 4306 protruding inwards from an inner wall bounding the though hole 4304. A generally V-shaped first locking block 4312 extends from the second side 431, neighboring the through hole 4304. Opposite sides of the first locking block 4312 form two resisting surfaces 4313 adjacent and perpendicular to the second side 431. A generally V-shaped second locking block 4314 extends from the second side 431, opposite to the first locking block 4312. Opposite sides of the second locking block 4314 form two resisting surfaces 4315 adjacent and perpendicular to the second side 431. A distance from the through hole 4304 to the first locking block 4312 is greater than a distance from the through hole 4304 to the second locking block 4314.

The fixing member 45 includes a fixing portion 451 defining a plurality of fixing holes 4512 in corners of the fixing portion 451, and a matching portion 452 extending from the fixing portion 451. The fixing portion 451 defines a round through hole 4513. The matching portion 452 surrounds the through hole 4513. The fixing portion 451 defines two opposite slots 4511 in a bottom of the fixing portion 451, opposite to the matching portion 452, and communicating with the round through hole 4513.

A generally V-shaped cutout 455 is defined in a circumference of the matching portion 452, communicating with the round through hole 4513. A helical slope 4522 and a helical sliding surface 4523 are formed in an end surface of the matching portion 452, opposite to the fixing portion 451. The slope 4522 and the sliding surface 4523 are at opposite sides of the cutout 455. The highest end of the sliding surface 4523 connects to a first inner wall bounding the cutout 455, and the lowest end of the slope 4522 connects to a second inner wall opposite to the first inner wall bounding the cutout 455. The lowest end of the slope 4522 forms a first stopping surface 4552 facing the cutout 455, and the highest end of the slope 4522 opposite to the lowest end of the slope 4522 forms a second stopping surface 4525 facing a lowest end of the sliding surface 4523. The lowest end of the sliding surface 4523 is slantingly connected to the second stopping surface 4525. In other embodiments, the slope 4522 can be a plan surface, and the first and second stopping surfaces 4552 and 4525 can be omitted.

The interfering member 47 is similar to the matching portion 452 of the fixing member 45. The interfering member 47 is generally cylindrical with a diameter less than the round through hole 4513 of the fixing member 45. Two opposite locking posts 471 radially extend out from a periphery of a first end of the interfering member 47. The interfering member 47 defines a through hole 470, to allow the shaft portion 414 of the connecting member 41 to extend therethrough. A helical engaging surface 472 and a slanting surface 473 are formed in a second end of the interfering member 47, opposite to the first end of the interfering member 47. A V-shaped receiving groove 474 is defined in the circumference of the interfering member 47 between the engaging surface 472 and the slanting surface 473. A highest end of the engaging surface 472 connects to a first wall bounding the receiving groove 474, and a highest end of the slanting surface 473 connects to a second wall opposite to the first wall bounding the receiving groove 474. A lowest end of the slanting surface 473 forms a first end surface 4732 facing a lowest end of the engaging surface 472, and the highest end of the slanting surface 473 opposite to the highest end of the engaging surface 472 forms a second end surface 4740 facing the highest end of the engaging surface 472. The lowest end of the engaging surface 472 is slantingly connected to the first end surface 4732. In other embodiments, the slanting surface 473 can be a planar surface, and the first and second end surfaces 4732 and 4740 can be omitted.

Figure 5:
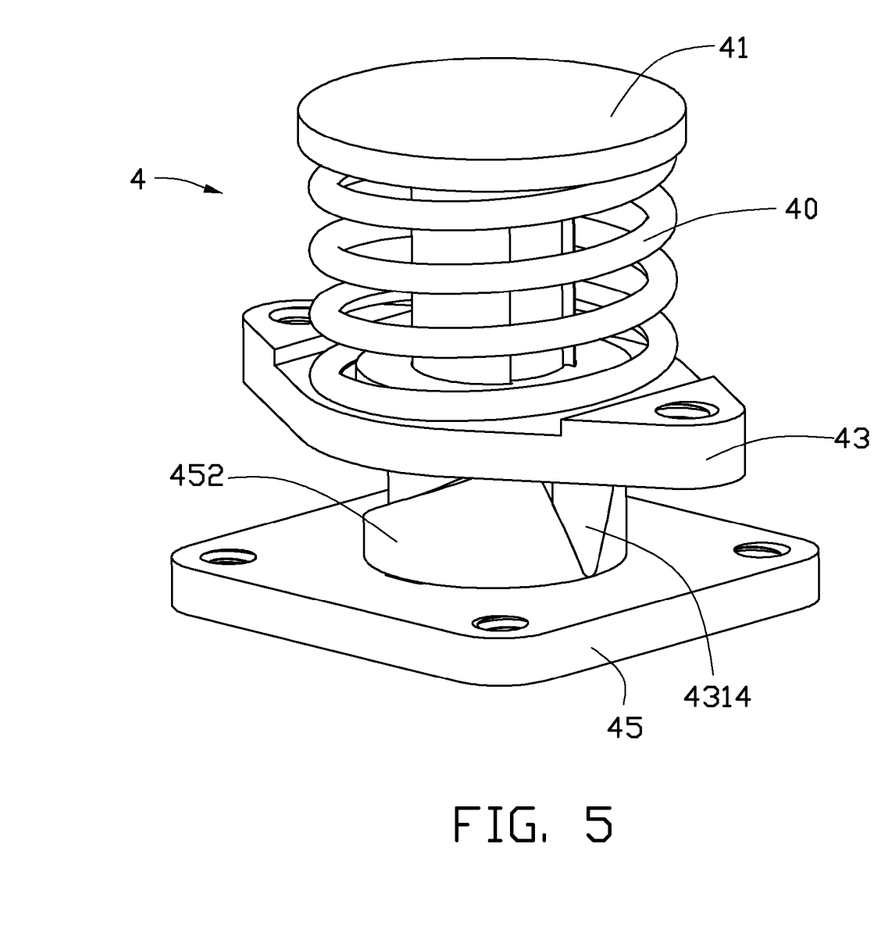
FIG. 5 is an assembled, isometric view of the hinge of FIG. 3.
Figure 6:
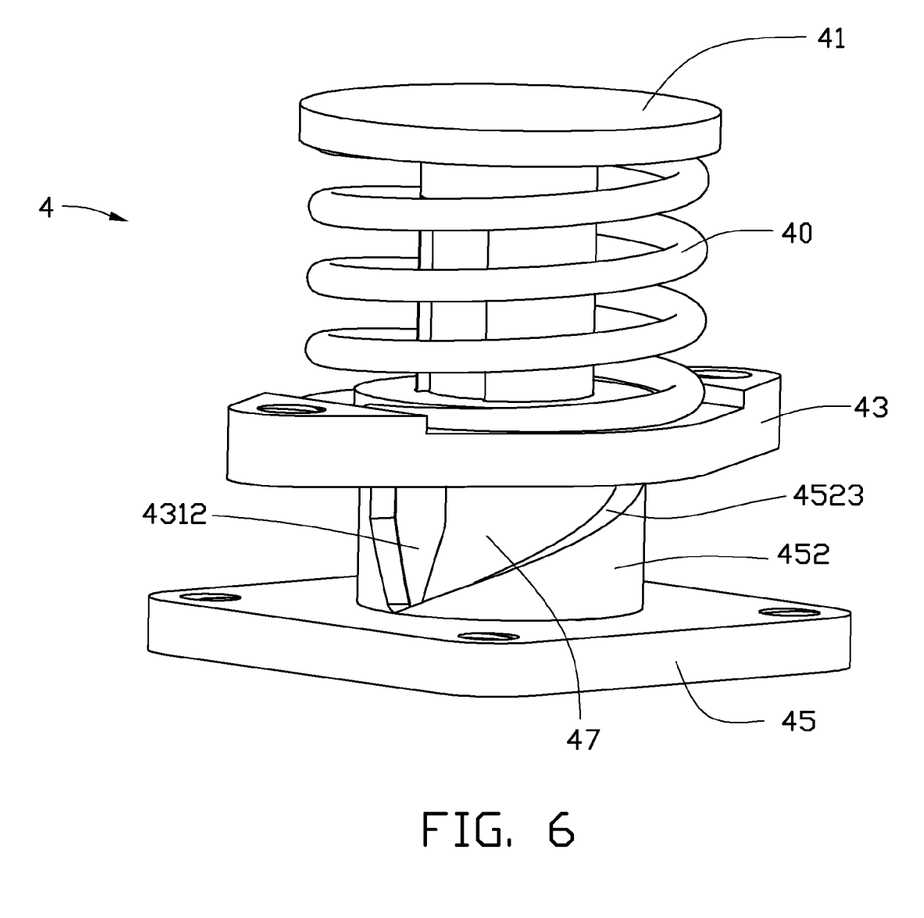
FIG. 6 is similar to FIG. 5, but viewed from another perspective.

Referring to FIGS. 5 and 6, in assembly of the hinge 4, the interfering member 47 is received in the round through hole 4513 of the fixing member 45, with the locking posts 471 of the interfering member 47 clamped in the slots 4511 of the fixing member 45. Therefore, the interfering member 47 is fixed to the fixing member 45, with the cutout 455 positioned opposite to the receiving groove 474 of the interfering member 47. The shaft portion 414 of the connecting member 41 is extended through the resilient member 40, the through hole 4304 of the rotating member 43, and the through hole 470 of the interfering member 47 in that order. The fastener 49 is extended through the through hole 480 of washer 48, and then screwed into the screw hole 418 of the connecting member 41. The washer 48 resists against the bottom of the fixing portion 451, to prevent the fixing member 45, the rotating member 43, and the resilient member 40 from disengaging from the shaft portion 414 of the connecting member 41.

In the aforementioned assembly, the fixing ribs 4306 of the rotating member 43 are engaged in the fixing slots 416 of the connecting member 41, such that the rotating member 43 is fixedly sleeved on the shaft portion 414 of the connecting member 41. The resilient member 40 is partially sleeved on the fixing protrusion 4302 of the rotating member 43, and opposite ends of the resilient member 40 elastically resist against the head portion 412 of the connecting member 41 and the first side 430 of the rotating member 43. The first locking block 4312 of the rotating member 43 is engaged in the receiving groove 474 of the interfering member 47, and the second locking block 4314 of the rotating member 43 is engaged in the cutout 455 of the fixing member 45. One of the resisting surfaces 4313 of the first locking block 4312 resists against the second end surface 4740 of the interference member 47. One of the resisting surfaces 4315 of the second locking block 4314 resists against the first stopping surface 4552 of the fixing member 47.

Figure 7:
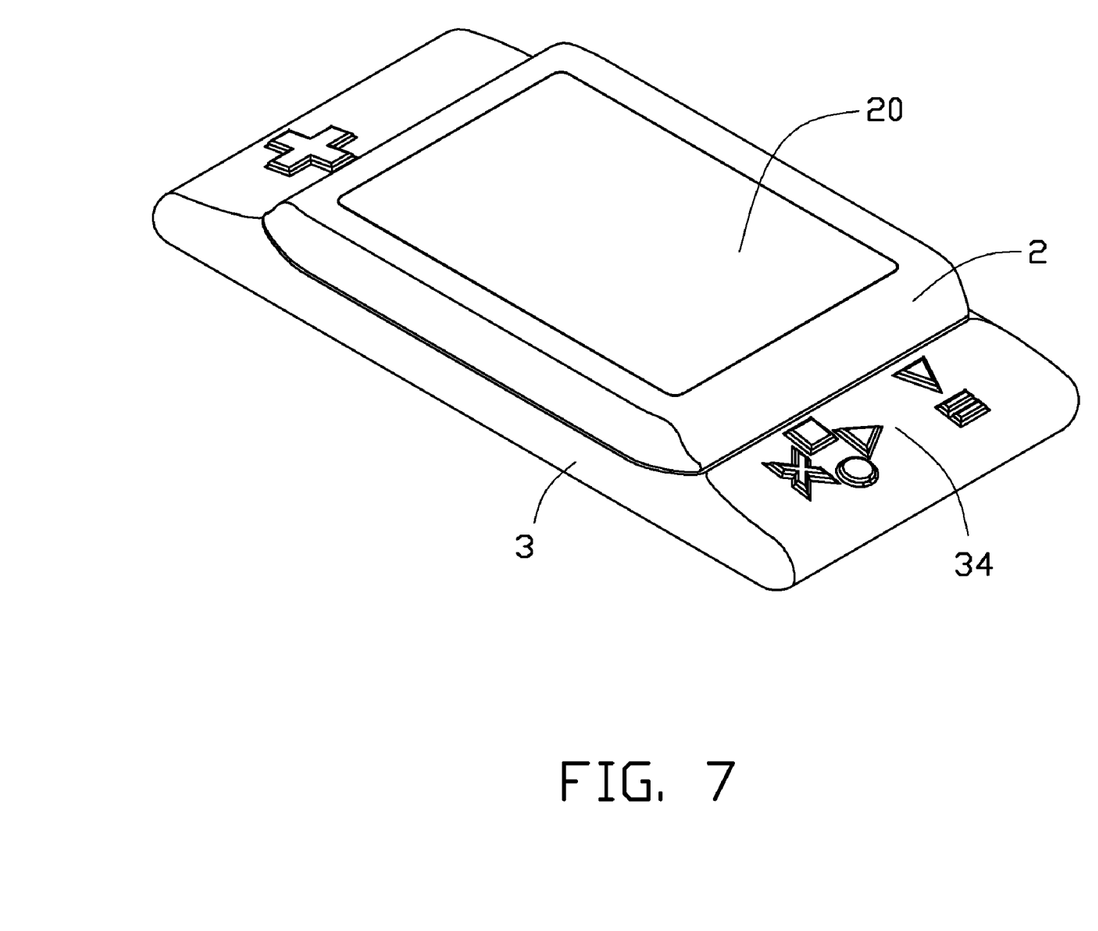
FIG. 7 is an assembled, isometric view of the collapsible device of FIG. 1.
Figure 8:
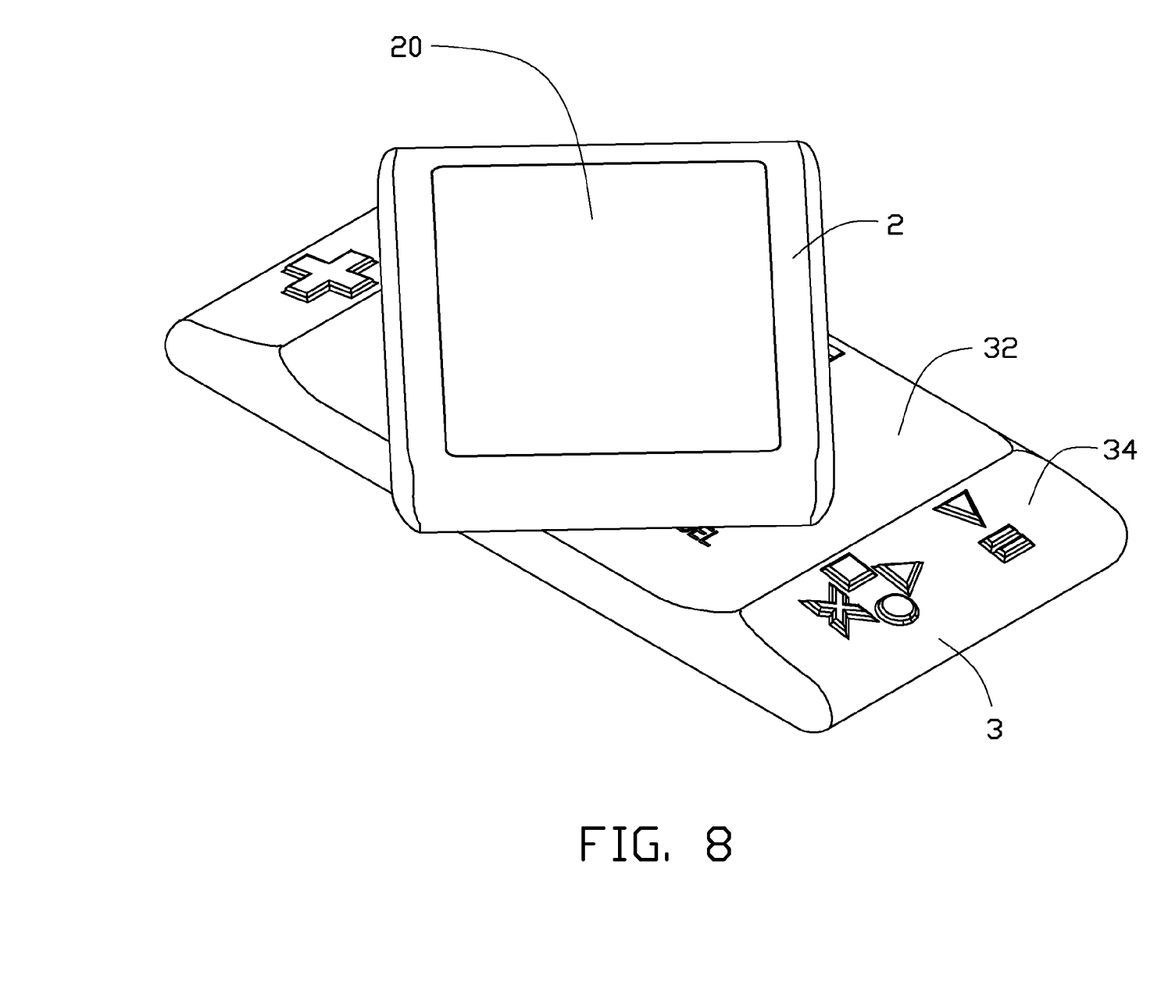
FIG. 8 is similar to FIG. 7, but showing the cover is rotated relative to the base.
Figure 9:
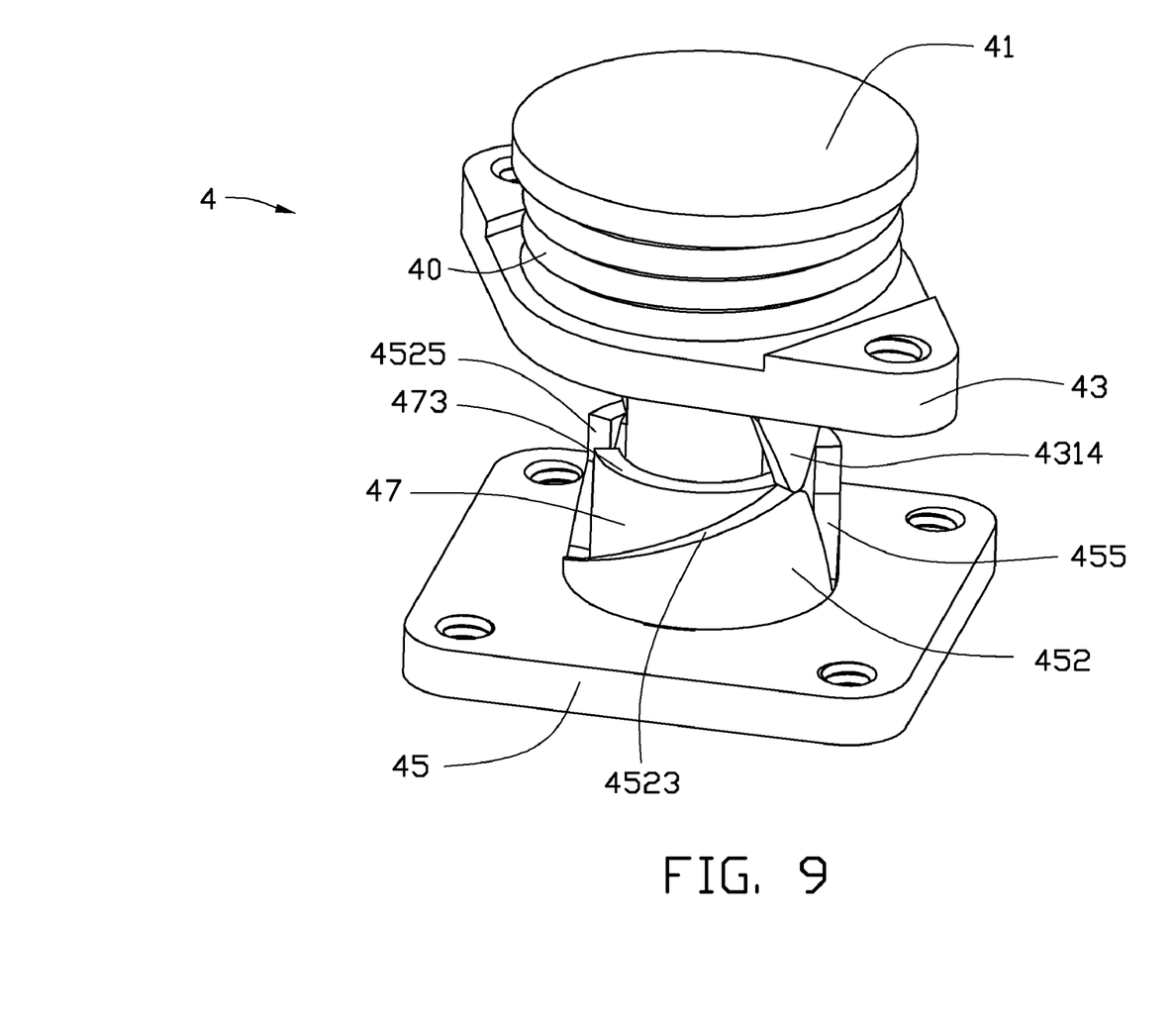
FIG. 9 is view of a state of the hinge utilized in the collapsible device of FIG. 8.
Figure 10:
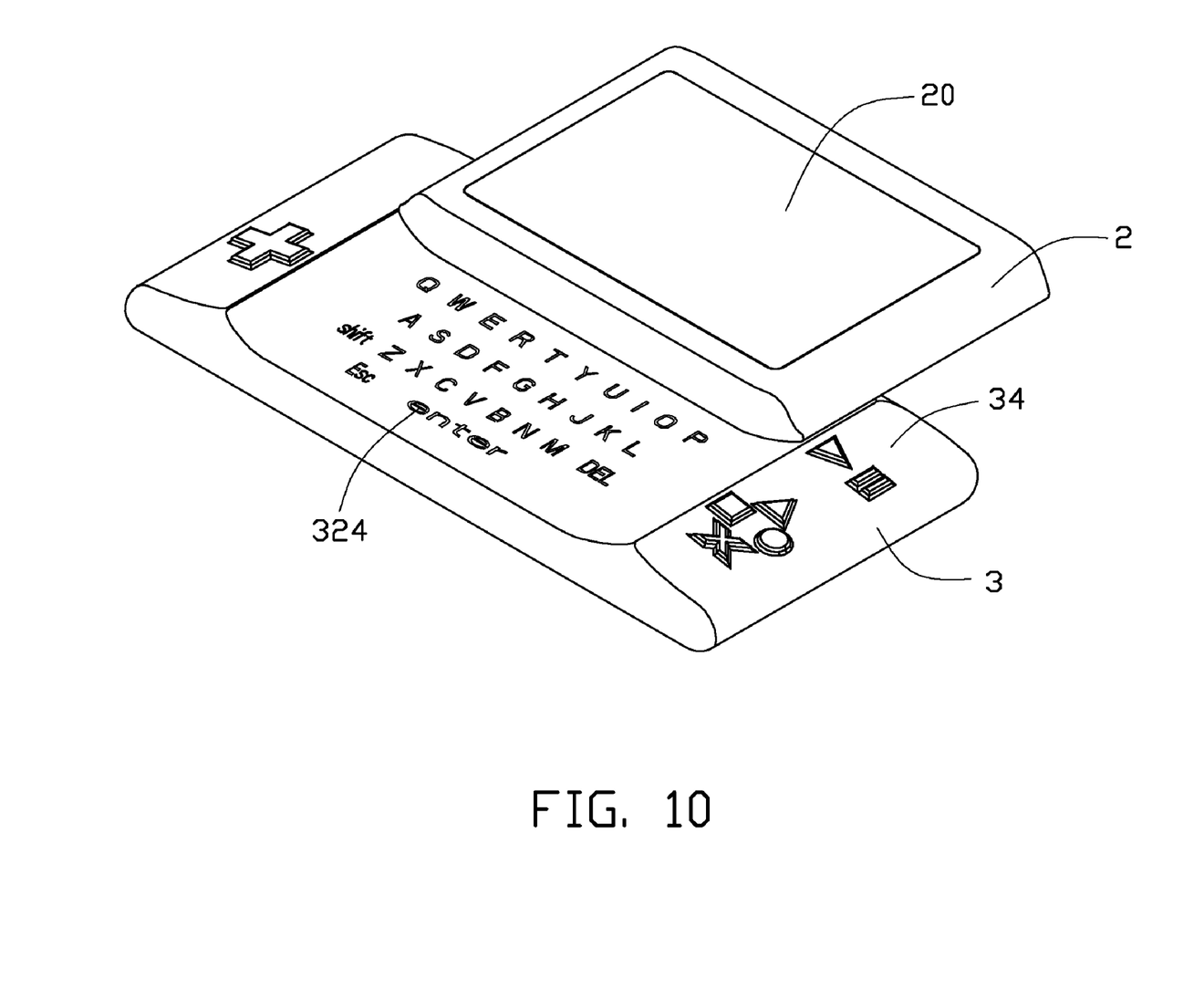
FIG. 10 is similar to FIG. 7, but showing the cover is completely opened relative to the base.
Figure 11:
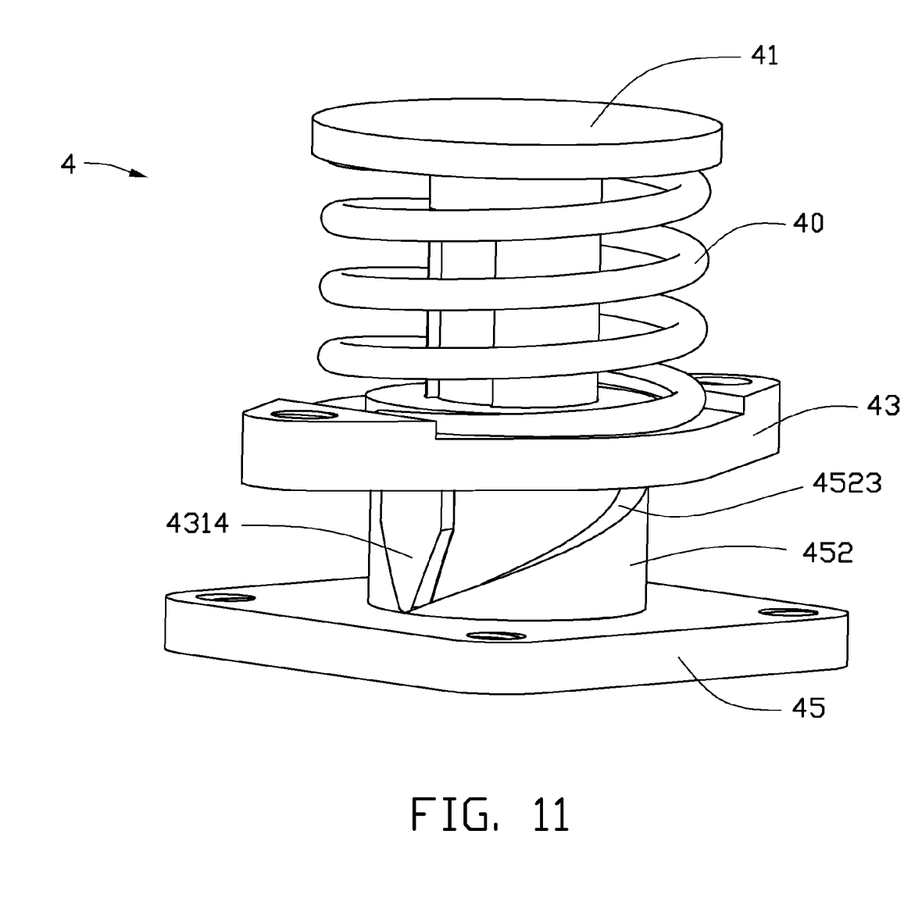
FIG. 11 is a view of another state of the hinge utilized in the collapsible device of FIG. 10.

Referring to FIG. 7, in assembly of the collapsible device, the fixing member 45 is received in the fixing slot 320 of the base 3, with the fixing holes 4512 aligned with the fixing holes 322. A plurality of bolts (not shown) are extended through the fixing holes 322, and then inserted into the fixing holes 451, resulting in fixing the hinge 4 to the base 3. Two bolts (not shown) are extended through the fixing holes 432 of the rotating member 43, and then inserted into the fixing holes 222 of the cover 2, to fix the rotating member 43 to the cover 2, with the head portion 412 of the connecting member 41 and a part of the resilient member 40 received in the receiving slot 220 of the cover 2. Therefore, the cover 2 is received in the groove 32 of the base 3, and covered the keyboard region 324 of the base 3, with the arc-shaped portions 24 of the cover 2 resisting against corresponding ends of the groove 32. In this time, the collapsible device can be operated to play games, see movies, or listen to the music via operating of the operating portions 34 of the base 3.

Referring to FIGS. 8 to 11, in use, to open the cover 2, it is rotated on a plane parallel to the display 20 around the connecting member 41. Synchronously, the first locking block 4312 moves out of the receiving groove 474 of the interfering member 47 to the highest end of the engaging surface 472. Correspondingly, the second locking block 4314 moves out of the cutout 455 of the fixing member 45 to the highest end of the sliding surface 4523. Thereby, the rotating member 43 is moved away from the fixing member 45 to further deform the resilient member 40, so that the cover 2 moves upwards from the groove 32 of the base 3.

When the cover 2 is rotated further, the first locking block 4312 moves on the receiving groove 474, and the second block locking block 4314 moves along the sliding surface 4523. In this process, the cover 2 is rotated to the rear side of the base 3, and moved towards the base 3. When one of the resisting surfaces 4313 of the first locking block 4312 resists against the first end surface 4732 of the interfering member 47, one of the resisting surfaces 4315 of the second locking block 4314 resists against the second stopping surface 4525 of the fixing member 45. The cover 2 is rotated 180 degrees and cannot be rotated farther, and the cover 2 is received in the groove 32 of the base 3 again, with a front side of the cover 2 exposed out from the rear side of the groove 32. Therefore, the keyboard region 324 of the base 3 is exposed to users.

When the collapsible device is closed, the cover 2 is rotated back 180 degrees, to cover the keyboard region 324 of the base 3. In this process, the first locking block 4312 moves into the receiving groove 474 of the interfering member 47 along the engaging surface 472. The second locking block 4314 moves into the cutout 455 of the fixing member 45 along the sliding surface 4523.

Obviously, in other embodiments, the fixing member 43 and the interfering member 47 can be combined with each other to form a single unit.

It is believed that the present embodiments and theirs advantages will be understood from the foregoing description, and they will be apparent that various changes may be made thereto without departing from the spirit and scope of the description or sacrificing all of its material advantages, the examples hereinbefore described merely being exemplary embodiments.

What is claimed is:

1. A collapsible device comprising:
   a cover comprising a display on a top of the cover;
   a base defining a groove extending through front and rear sides of the base, the groove defining a keyboard region adjacent to the front side, and a fixing slot adjacent to the rear side; and
   a hinge connected between a bottom of the cover and the fixing slot, the hinge comprises:
      a rotating member fixed to the cover, a first locking block and a second locking block opposite to the first locking block extend from the rotating member, the rotating member defines a through hole, opposite fixing ribs protruding inwards from the through hole from an inner wall bounding the though hole, a connecting member fixed to the rotating member, the connecting member comprises a shaft portion defining two fixing slots in the circumferential surface of the shaft portion, a fixing member sleeved on the connecting member, the fixing member comprises a helical sliding surface, and an interfering member fixed to the fixing member, the interfering member comprises a helical engaging surface, opposite to the helical sliding surface of the fixing member, wherein, the first and second locking blocks are operable of sliding on the helical engaging surface and the helical sliding surface, correspondingly; and wherein each of the fixing ribs of the rotating member are engaged in a respective fixing slot of the two fixing slots of the connecting member;

wherein the cover is rotatably received in the groove via the hinge, the cover is operable of rotating relative to the display around the hinge, to cover or expose the keyboard region.

2. The collapsible device of claim 1, wherein the base comprises two operating portions respectively adjacent to opposite ends of the groove, and each operating portion curvedly extends to connect to a corresponding end of the groove, the cover further comprises two arc-shaped portions situated at opposite ends of the cover, the arc-shaped portions abut against the corresponding ends of the groove.

3. The collapsible device of claim 2, wherein the rotating member fixed to the connecting member, the bottom of the cover defines a receiving slot to partially receive the connecting member, and the rotating member is fixed to the bottom of the cover.

4. The collapsible device of claim 3, wherein the fixing member sleeved on the connecting member, the fixing member is fixed in the fixing slot of the base.

5. The collapsible device of claim 1, wherein a cylindrical fixing protrusion protrudes from the rotating member, opposite to the first and second locking blocks, the connecting member further comprises a head portion, the hinge further comprises a resilient member having an inner diameter equal to a diameter of the fixing protrusion, the fixing protrusion can be received in the resilient member, and the resilient member elastically resist against the head portion and the rotating member.

6. The collapsible device of claim 1, wherein the first and second locking blocks are generally V-shaped, and surround the through hole of the rotating member, a distance from the first locking block to the through hole is smaller than a distance from the second locking block to the through hole.

7. The collapsible device of claim 6, wherein the fixing member comprises a fixing portion fixed in the fixing slot of the base, and a matching portion extending from the fixing portion, a generally V-shaped cutout is defined in a circumference of the matching portion, for slidably receiving the second locking block of the rotating member, the sliding surface is formed in an end surface of the matching portion, and a highest end of the sliding surface connects to a wall bounding the cutout.

8. The collapsible device of claim 6, wherein the interfering member defines a generally V-shaped receiving groove in a circumference of the interfering member, for slidably receiving the first locking block, the engaging surface is formed in an end surface of the interfering member, and a highest end of the engaging surface connects to a wall bounding the receiving groove.

9. The collapsible device of claim 8, wherein the fixing member defines a round through hole for receiving the interfering member, and two slots communicating with the round through hole, two locking posts extend out from a periphery of the interfering member, to engage in the two slots, correspondingly.

10. The collapsible device of claim 9, wherein the interfering member defines a through hole communicating with the receiving groove, for the shaft portion of the connecting member rotatably extending through the interfering member, the hinge further comprises a washer defining a through hole, and a fastener, the fastener is passed through the through hole of the washer, and inserted into a distal end of the shaft portion, with the washer abutting against the fixing member.

* * * * *